United States Patent [19]

Ito

[11] Patent Number: 5,263,692
[45] Date of Patent: Nov. 23, 1993

[54] FLUID-FILLED CYLINDRICAL ELASTIC MOUNT HAVING AXIALLY EXTENDING LEGS FOR LIMITING AXIAL SPACING BETWEEN AXIALLY OPPOSED INTERMEDIATE SUPPORT MEMBERS

[75] Inventor: Michio Ito, Inuyama, Japan

[73] Assignee: Tokai Rubber Industries, Ltd., Japan

[21] Appl. No.: 832,040

[22] Filed: Feb. 6, 1992

[30] Foreign Application Priority Data

Feb. 14, 1991 [JP] Japan .................. 3-12597[U]

[51] Int. Cl.$^5$ .......................... B60G 13/08
[52] U.S. Cl. ................ 267/140.12; 267/140.13; 267/220
[58] Field of Search ........ 267/140.13, 140.12, 267/140.11, 219, 220, 35; 248/550, 562

[56] References Cited

U.S. PATENT DOCUMENTS

| | | | |
|---|---|---|---|
| 5,013,012 | 5/1991 | Jouade | 267/140.12 |
| 5,040,775 | 8/1991 | Miyakawa | 267/140.13 |
| 5,088,704 | 2/1992 | Kanda | 267/140.13 |
| 5,131,638 | 7/1992 | Hein et al. | 267/220 |

FOREIGN PATENT DOCUMENTS

| | | | |
|---|---|---|---|
| 3823238 | 2/1989 | Fed. Rep. of Germany | 267/220 |
| 3839699 | 7/1989 | Fed. Rep. of Germany | 267/220 |

*Primary Examiner*—Matthew C. Graham
*Attorney, Agent, or Firm*—Parkhurst, Wendel & Rossi

[57] ABSTRACT

A fluid-filled cylindrical elastic mount having an inner and an outer sleeve, a pair of intermediate support members axially opposed to each other and having respective cylindrical portions with a predetermined axial spacing therebetween, and an elastic body elastically connecting the inner sleeve and the support members. The elastic body cooperates with the inner sleeve to define an annular recess which is open radially outwardly through the axial spacing between the cylindrical portions of the support member. The outer sleeve is fitted on cylindrical portions of the support members, so as to close the annular recess to thereby form an annular fluid chamber. A spacer is interposed between the cylindrical portions of the support members, to prevent a relative axial movement of the support members toward each other and thereby maintain the predetermined axial spacing between the cylindrical portions.

10 Claims, 3 Drawing Sheets

FLUID-FILLED CYLINDRICAL ELASTIC MOUNT HAVING AXIALLY EXTENDING LEGS FOR LIMITING AXIAL SPACING BETWEEN AXIALLY OPPOSED INTERMEDIATE SUPPORT MEMBERS

BACKGROUND OF THE INVENTION

1. Field of the Invention

The present invention relates in general to a fluid-filled cylindrical elastic mount adapted primarily to damp input vibrations received in the axial direction, and more particularly to an improved construction of such an elastic mount which is capable of exhibiting desired damping characteristics with high stability, while maintaining sufficient mechanical strength with respect to the input vibrational load.

2. Discussion of the Related Art

As one type of a mounting device interposed between two members in a vibration system to connect these two member in a vibration-damping fashion, there is known a cylindrical elastic mount wherein an inner and an outer sleeve are disposed in a radially spaced relationship and are elastically connected by an elastic body interposed therebetween, primarily for damping or isolating vibrations applied between the two sleeves in their axial direction. Such a cylindrical elastic mount is suitably used in automotive suspension systems, for example, as an upper support, a strut-bar cushion, a tension rod bushing, and a body mount.

Keeping pace with a recent growing demand for motor vehicles of higher grades, there is an increasing requirement for a cylindrical elastic mount having an improved vibration damping or isolating function. One considered approach to satisfy this requirement is to provide the cylindrical elastic mount with a chamber filled with a fluid. The assignee of this application proposed such a fluid-filled cylindrical elastic mount in the form of an upper support for a motor vehicle, as disclosed in Japanese Patent Application No. 1-99012 filed Aug. 24, 1989, which had not been published at the time when the present invention was made (Feb. 14, 1991).

The proposed fluid-filled cylindrical elastic mount includes (i) an inner sleeve having an annular wing portion which extends radially outwardly from an axially intermediate portion thereof, (ii) a pair of intermediate support members which are opposed to each other in an axial direction thereof with a predetermined axial spacing therebetween, each one of the support members having an annular bearing portion which faces the annular wing portion of the inner sleeve in the axial direction, and a cylindrical portion which extends from the outer periphery of the annular bearing portion in the axial direction toward the other support member, (iii) an elastic body elastically connecting the inner sleeve and the pair of intermediate support members, such that the elastic body and the inner sleeve cooperate to define an annular recess which is open radially outwardly through the axial spacing between the cylindrical portions of the intermediate support members and whose bottom is raised by the annular wing portion of the inner sleeve, and (iv) an outer sleeve fitted on the outer circumferential surfaces of the intermediate support members, so as to close the opening of the annular annular recess and thereby form an annular fluid chamber which has an axially middle restricted portion whose radial dimension is reduced by the annular wing portion. When a vibrational load is applied between the inner and outer sleeves of the thus constructed elastic mount in the axial direction, the elastic mount exhibits an excellent vibration damping effect based on the resonance of the fluid in the fluid chamber, that cannot be obtained on an elastic mount which does not have a fluid chamber, i.e., which relies only on the elastic property of an elastic body.

However, a further study by the applicant indicated a problem with the fluid-filled cylindrical elastic mount described above in which the two separate opposed intermediate support members spaced apart from each other in the axial direction are held in position by the outer sleeve which is fitted on the outer circumferential surfaces of the cylindrical portions of the intermediate support members. That is, this cylindrical elastic mount suffers from insufficient mechanical strength of the outer sleeve to withstand an axial force which acts on the outer sleeve and the intermediate support members so as to move the two support members relative to each other in the axial direction.

Explained more specifically, a relative axial displacement of the two intermediate support members away from each other can be prevented by the outer sleeve which is caulked against the intermediate support members, or by suitable stop members attached to a mounting bracket fixed to the outer sleeve. However, it is considerably difficult to prevent a relative axial displacement of the two support members toward each other and thereby prevent undesirable reduction in the axial spacing between the two support members when a relatively large axial vibrational load is applied to the elastic mount. The reduction in the axial spacing of the two support members causes deformation or distortion of the elastic body and the annular fluid chamber, which in turn gives an adverse effect on the vibration damping or isolating properties of the elastic mount. Namely, the proposed fluid-filled cylindrical elastic mount is still unsatisfactory and needs to be improved in terms of its mechanical strength and vibration damping stability.

SUMMARY OF THE INVENTION

It is therefore an object of the present invention to provide a fluid-filled cylindrical elastic mount having an improved construction capable of exhibiting a desired vibration damping effect with high stability, while maintaining mechanical strength sufficient to maintain a predetermined relative axial spacing of the axially opposed intermediate support members.

The above object may be accomplished according to the principle of the present invention, which provides a fluid-filled cylindrical elastic mount for connecting a first and a second member in a vibration-damping manner, comprising: (a) an inner sleeve to be fixed to one of said first and second members, the inner sleeve having an annular wing portion radially outwardly extending from an axially intermediate portion thereof; (b) a pair of intermediate support members opposed to each other in an axial direction thereof with a predetermined axial spacing therebetween, each one of the support members having an annular bearing portion which faces the annular wing portion of the inner sleeve in the axial direction with a predetermined axial spacing therebetween, and a cylindrical portion which extends from an outer periphery of the annular bearing portion in the axial direction toward the other of the support members; (c) spacing means interposed between the cylindrical portions of the pair of intermediate support members, for maintaining the predetermined axial spacing between the support members; (d) an elastic body interposed between and elastically connecting the inner sleeve and the pair of intermediate support members, the elastic body cooperating with the inner sleeve to define an annular recess which is open radially outwardly through an axial spacing between the cylindrical portions of the support members, the annular recess having a bottom partially raised in a radially outward direction by the annular wing portion; and (e) an outer sleeve to be fixed to the other of the first and second members. The outer sleeve is fitted on outer circumferential surfaces of the cylindrical portions of the support members, so as to fluid-tightly close an opening of the annular recess to thereby form an annular fluid chamber which is filled with a non-compressible fluid and which has an axially middle restricted portion whose radial dimension is reduced by the annular wing member.

In the fluid-filled cylindrical elastic mount of the present invention constructed as described above, the cylindrical portions of the two intermediate support members are opposed to each other in the axial direction, radially outwardly of the inner sleeve. The spacing means interposed between the cylindrical portions of the two intermediate support members functions to prevent the two support members from moving toward each other in the axial direction of the elastic mount, thereby maintaining the predetermined relative axial spacing of the two support members.

According to the above-described arrangement of the instant fluid-filled cylindrical elastic mount having the spacing means, even a relatively large vibrational load applied to the elastic mount does not cause a relative axial displacement of the two intermediate support members toward each other, whereby the elastic body and the fluid chamber are effectively protected against deformation or distortion due to the relative axial movement of the two support members. Thus, the present elastic mount is capable of exhibiting the intended vibration damping characteristics with high stability.

BRIEF DESCRIPTION OF THE DRAWINGS

The above and other objects, features and advantages of the present invention will become more apparent by reading the following detailed description of a presently preferred embodiment of the invention, when considered in conjunction with the accompanying drawings, in which.

DETAILED DESCRIPTION OF THE PREFERRED EMBODIMENT

Figure 1:
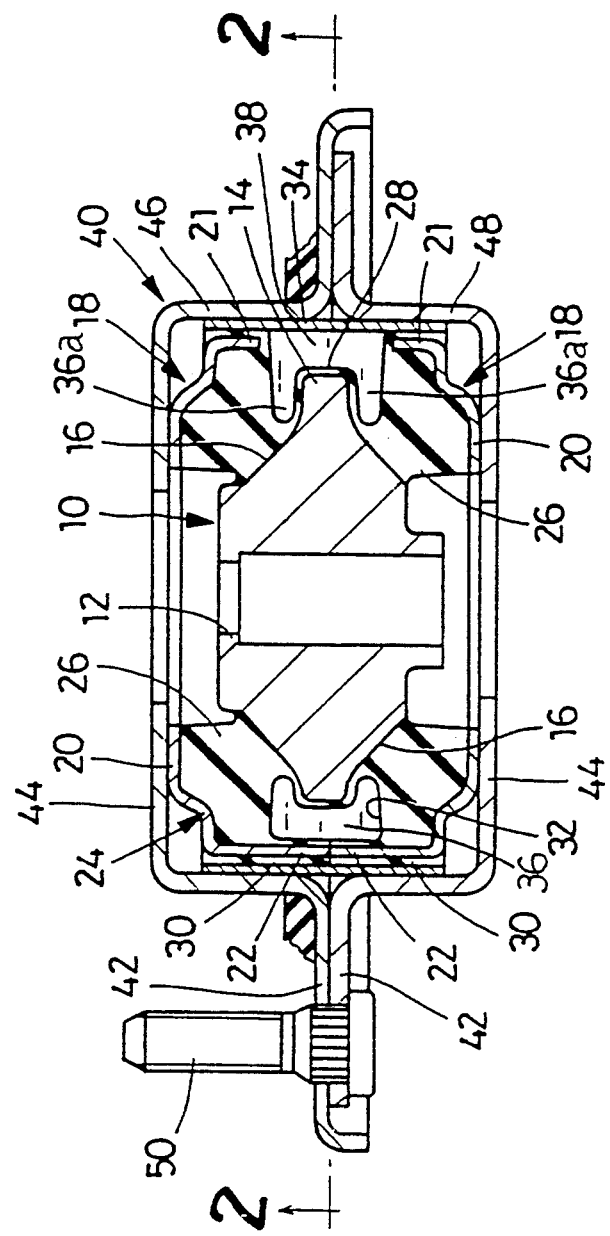
FIG. 1 is an elevational view in cross section taken along line 1—1 of FIG. 2, showing one embodiment of a fluid-filled cylindrical elastic mount in the form of an upper support adapted for use in a suspension system of a motor vehicle.
Figure 2:
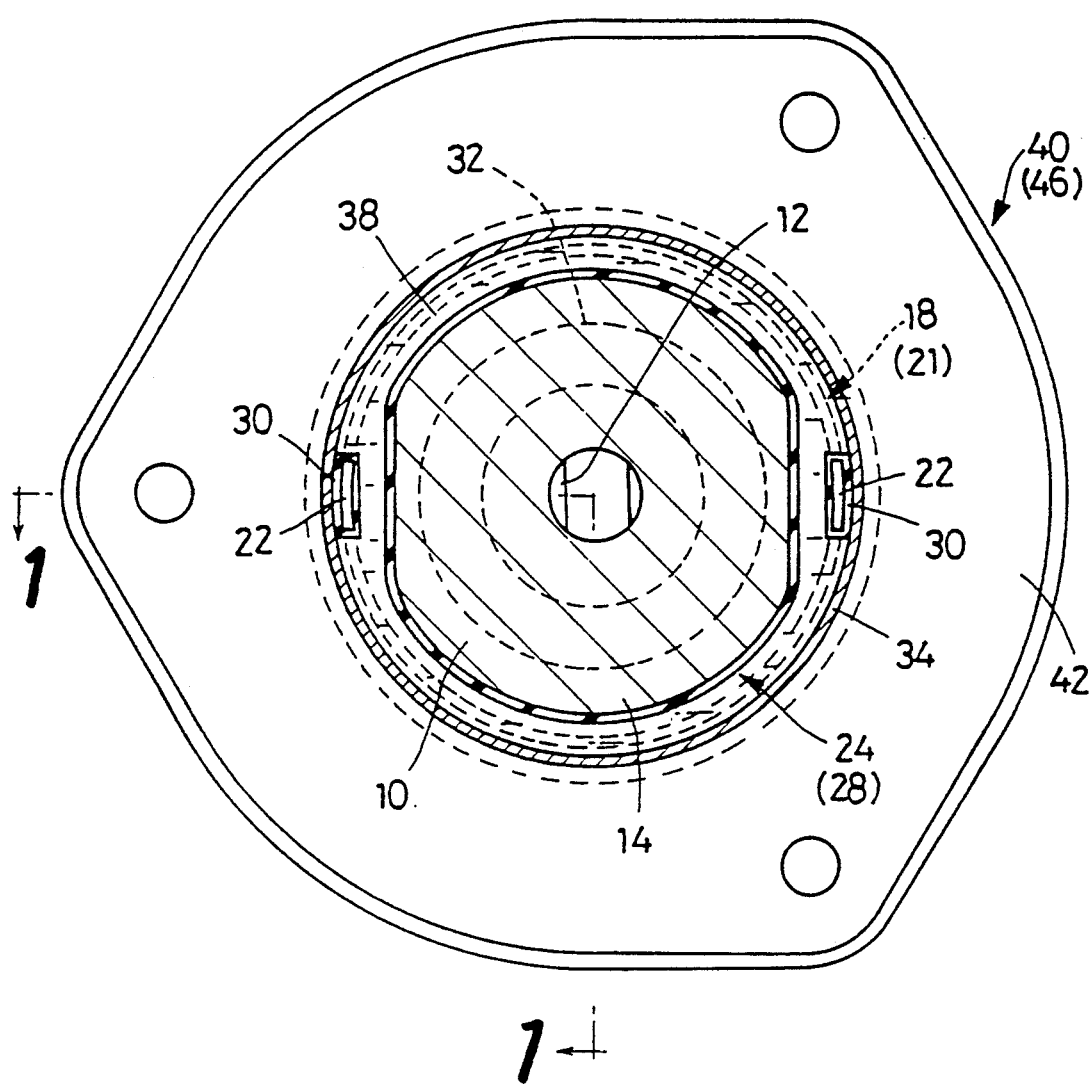
FIG. 2 is a cross sectional view taken along line 2—2 of FIG. 1.

Referring to FIGS. 1 and 2, there is shown one embodiment of this invention as applied to a fluid-filled cylindrical upper support for a rear suspension system of a denotes an inner sleeve, which is made of a metal and has a generally cylindrical shape with a relatively large wall thickness. As shown in FIG. 1, the inner sleeve has a center bore for fixing the upper support to a shock absorber provided in the rear suspension system of the vehicle. As most clearly shown in FIG. 2, the center bore has an axial end portion 12 partially defined by diametrically opposed parallel flat surfaces formed for engagement with the connecting end of the shock absorber.

The inner sleeve 10 includes an integrally formed annular wing portion 14 which extends radially outwardly from an axially intermediate portion. The inner sleeve 10 has a pair of tapered outer circumferential surfaces 16, 16 which terminate in the annular wing portion 14. In other words, the tapered outer circumferential surfaces 16 are formed on the axially opposite sides of the axially intermediate annular wing portion 14, such that the diameter of each tapered surface 16 continuously increases in the axial direction from the corresponding axial end of the inner sleeve 10 toward its axially intermediate portion.

Radially outwardly of the inner sleeve 10, there are disposed a pair of intermediate support members 18, which are opposed to each other in the axial direction of the inner sleeve. As most clearly shown in FIG. 3, each one of the two support members 18 has an annular bearing portion 20, and a cylindrical portion 21 which extends from the outer periphery of the annular bearing portion 20 in the axial direction toward the other support member 18. The two support members 18 are coaxially positioned with respect to each other, coaxially with the inner sleeve 10, with a predetermined axial spacing therebetween, such that the annular bearing portions 20 face the annular wing portion 14 and the tapered surfaces 16 of the inner sleeve 10, in the axial direction, with a predetermined axial spacing to the wing portion 14.

Figure 3:
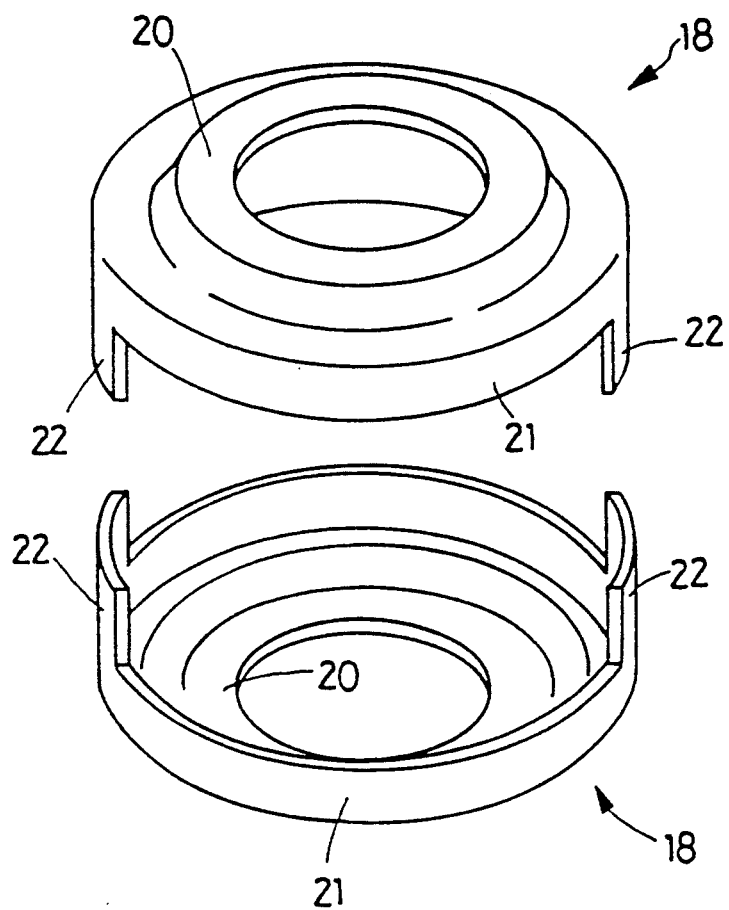
FIG. 3 is an exploded perspective view of a pair of intermediate support members used in the upper support of FIG. 1.

As shown in FIG. 3, the cylindrical portion 21 of each support member 18 is provided with a pair of integrally formed legs 22. These two legs 22 extend from the end face of the cylindrical portion 21 in the axial direction of the cylindrical portion, and are opposed to each other in a diametric direction of the cylindrical portion 21. The two support members 18, 18 are oriented such that the end faces of the two legs 22 of one of the support members are held in abutting contact with the end faces of the corresponding legs 22 of the other support member, as shown in FIG. 1, so as to determine the axial spacing between the two support members 18, 18, so that an assembly the two support members 19 maintains a predetermined axial distance between the annular bearing portions 20, and a predetermined axial distance between the cylindrical portions 21. The legs 22 function to prevent a relative axial displacement of the two support members 18 in the axial direction toward each other.

Between the inner sleeve 10 and the assembly of the two intermediate support members 18, there is formed an elastic body 24 such that the inner circumferential surfaces of the elastic body 24 are bonded by vulcanization to the outer circumferential surfaces of the inner sleeve 10, while the outer surfaces of the elastic body 24 are bonded by vulcanization to the inner surfaces of the support members 18. Thus, the inner sleeve 10, support members 18 and elastic body 24 constitute an inner assembly of the upper support. The elastic body 24 includes: a pair of annular connecting portions 26, 26 interposed between the tapered outer circumferential surfaces 16 of the inner sleeve and the opposite annular sections of the support members 18; an annular outer sealing rubber layer 30 formed on the outer surfaces of the cylindrical portions 21 and legs 22; and an annular inner buffer layer 28 formed on the circumferential end face of the annular wing portion 14.

The thus constructed inner assembly of the upper support has an annular recess 32 which is formed between the two connecting portions 26 of the elastic body 24, so as to extend along the entire circumference of the annular wing portion 14 of the inner sleeve 10. This annular recess 32 is open radially outwardly of the two support members 18 through two arcuate openings each formed between the two cylindrical portions 21 and between the mutually abutting legs 22. The annular recess 32 is generally U-shaped in cross section of FIG. 1, with its bottom being raised at its axially intermediate portion in the radially outward direction by the annular wing portion 14 of the inner sleeve 10. While the circumferential opening of the annular recess 32 is partially closed by the legs 22 formed with the support members 18, the formation of the annular recess 32 along the entire circumference of the support members 18 while extending radially inside of the legs 22 can be facilitated by vulcanizing the elastic body 24 in a split mold which consists of generally semi-cylindrical halves which are butted together in a plane parallel to the diametric direction of the support members 18 in which the legs 22 are opposed to each other.

An outer sleeve 34 also made of a metal is fitted on the outer circumferential surface of the inner assembly 10, 18, 24, and radially inwardly compressed against the inner assembly, by a drawing operation. For example, the drawing operation may be conducted by using eight dies disposed around the circumference of the outer sleeve 34. With the outer sleeve 34 fitted on the inner assembly, the annular recess 32 is fluid-tightly closed with the aid of the sealing rubber layer 30 which is compressed by the outer sleeve 34 against the outer surfaces of the support members 18. Thus, there is formed an annular fluid chamber 36 corresponding to the annular recess 32, which is defined by the elastic body 24 and the outer sleeve 34.

The fitting and drawing operations of the outer sleeve 34 on the inner assembly 10, 18, 24 are effected within a mass of a selected non-compressible fluid, so that the annular fluid chamber 36 is filled with the non-compressible fluid. For the fluid-filled upper support to be able to provide an effective vibration damping effect based on the flow of the fluid within the fluid chamber 36, it is desirable that the non-compressible fluid have a low viscosity value not higher than 0.1Pa.s. In this respect, water, alkylene glycol, polyalkylene glycol and silicone oil, for example, are preferably used as the non-compressible fluid.

In the presence of the annular wing portion 14 of the inner sleeve 10 which extends into the annular fluid chamber 36, the radial dimension of the fluid chamber 36 at its axially middle portion is reduced by the wing portion 14, whereby the fluid chamber 36 is substantially divided into two sections 36a, 36a on the axially opposite sides of the annular wing portion 14. These two sections 36a, 36a communicate with each other through an annular restricted portion 38 which is defined by the end face of the wing portion 14 (buffer layer 28) and the corresponding portion of the inner circumferential surface of the outer sleeve 34.

On the outer sleeve 34, there is fitted a mounting bracket 40 which consists of an upper cylindrical member 46 and a lower cylindrical member 48, as shown in FIG. 1. Each of the upper and lower cylindrical members 46, 48 has an outward flange 42 and an inward flange 44 which extend radially outwardly and inwardly from the opposite axial ends of the cylindrical portion, respectively. The two cylindrical members 46, 48 are fitted on the outer sleeve 34 such that the outward flanges 42, 42 are superposed on each other at the axially middle portion of the outer sleeve 34. The superposed outward flanges 42 has three fixing bolts 50 secured thereto for fixing the upper support to the body of the vehicle.

With the mounting bracket 40 fitted on the outer sleeve 34, the intermediate support members 18 are axially pressed toward each other, with the inward flanges 44 held in pressing contact with the respective annular bearing portions 20 of the support members 18. Thus, the support members 18 are prevented by the mounting bracket 40 from being moved away from each other in the axial direction, relative to the outer sleeve 34.

Upon application of an axial vibrational load between the inner and outer sleeves 10, 34 of the fluid-filled cylindrical upper support constructed as described above, there arises a volumetric change between the two sections 36a, 36a of the fluid chamber 36, whereby the fluid is forced to flow between the sections 36a, 36a through the restricted fluid passage in the form of the restricted portion 38. As a result, the vibrational load is damped based on the resonance of the fluid flowing through the restricted portion 38. The provision of the fluid chamber 36 gives the upper support an effectively reduced dynamic spring constant with respect to input vibrations having medium to high frequencies, for example, which affect the driving comfort of the motor vehicle. The range of frequency of the input vibrations to which the upper support exhibits an excellent damping or isolating effect is selected by tuning the restricted portion 38, namely, by suitably adjusting the axial length and cross sectional area of the restricted portion 38.

The present fluid-filled cylindrical upper support has a significant advantage, which accrues from the provision of the axial spacing means in the form of the legs 22 formed integrally with the cylindrical portions 21 of the two support members 18. More specifically, the legs 22 which are held in abutting contact with each in the axial direction of the support members 18 function to prevent the relative axial displacement of the two support members 18 toward each other, thereby maintaining the predetermined axial spacing between the two support members 18 (predetermined axial spacing between the cylindrical portions 21). This arrangement is effective to prevent deformation or distortion of the elastic body 24 due to the axial movement of the support members 18 toward each other even when the vibration applied in the axial direction has a considerably large magnitude. It will therefore be understood that the provision of the spacing legs 22 ensures complete freedom of the upper support from the conventionally experienced deterioration of the damping characteristics, and assures the intended damping effect with high stability, regardless of the magnitude of the input vibration load in the axial direction.

It is also appreciated that the inward flanges 44, 44 of the mounting bracket 40 also function to prevent the relative axial movement of the two support members 18 away from each other, thereby effectively avoiding the undesirable change in the damping characteristics due to the axial movement away from each other.

Further, the tapered outer circumferential surfaces 16 of the inner sleeve 10 connected to the intermediate support members 18 through the elastic body 24 permit the instant upper support to exhibit a soft spring characteristic when the upper support is subjected to a vibrational load which acts on the upper support so as to cause the axes of the inner and outer sleeves 10, 34 to be inclined or pivoted relative to each other. More particularly described, the deformation of the elastic body 12 which occurs upon application of such a vibrational load between the two sleeves 10, 34 takes the form of a shearing strain owing to the presence of the tapered surfaces 16, whereby the present upper support permits a smooth operation of the suspension system, while suitably absorbing pivotal movements of the piston rod of the shock absorber, for example, which cause pivotal movements of the inner sleeve 10 relative to the axis of the outer sleeve 34. This arrangement ensures further improvement in the driving comfort of the vehicle.

While the present invention has been described above in detail in its presently preferred embodiment, for illustrative purpose only, it is to be understood that the invention is not limited to the details of the illustrated embodiment.

For example, the illustrated embodiment in which each of the two intermediate support members 18, 18 has the two legs 22 integral with the cylindrical portions 21 may be modified such that only one of the support members 18 has the legs extending toward the other support member for direct abutting contact with the end face of the cylindrical portion 21 of the latter support member.

In the illustrated embodiment, the two legs 22 are provided on each support member 18, in an opposed relationship with each other in the diametric direction of the cylindrical portion 21. However, only one leg or three or more legs may be provided on one or both of the support members 18. Further, the legs 22 may be replaced by other forms of axially spacing means which is either integral with the support member or members 18, or separate from the support members 18, as long as the spacing means is interposed between the two support members 18 so as to prevent the relative axial displacement of the two support members 18 toward each other.

Although the mounting bracket 40 is used to prevent the relative axial displacement of the two support members 18 away from each other, this displacement may be prevented by providing the outer sleeve 34 with inward flanges radially inwardly extending at the opposite axial ends, so that the inward flanges are held in contact with the outer surfaces of the annular bearing portions 20 of the support members 18. It is also noted that the present upper support need not be provided with such stopper means for preventing the displacement of the two support members 18 away from each other, where suitable stopper means is provided on the vehicle body, as in the case where the upper support is used as a strut-bar cushion, for example.

While the separate mounting bracket 40 is provided on the outer surface of the outer sleeve 34, the outer sleeve may be provided with an integrally formed mounting bracket portion for fixing the upper support to the vehicle body.

In the illustrated embodiment, the tapered outer circumferential surfaces 16 are provided on the inner sleeve 10. However, the tapered surfaces 17 may be replaced by straight surfaces, as long as the inner sleeve 10 is provided with a suitable annular wing portion or wing member at an axially intermediate portion, so as to substantially divide the fluid chamber 36 into two sections.

Although the annular wing portion 14 is formed integrally with the inner sleeve 10, a suitable annular wing member separate from the inner sleeve 10 may be fixed to the inner sleeve 10, for example, by press-fitting on the outer circumferential surface of the inner sleeve 10.

While the present invention has been described in its presently preferred embodiment in the form of an upper support for a suspension system of an automotive vehicle, the principle of this invention is equally applicable to other types of a fluid-filled cylindrical elastic mount, such as a strut-bar cushion, tension rod bushing, and a body mount for the vehicles.

It is to be understood that the present invention may be embodied with various other changes, modifications and improvements, which may occur to those skilled in the art, without departing from the spirit and scope of the invention defined in the following claims.

What is claimed is:

1. A fluid-filled cylindrical elastic mount for connecting a first and a second member in a vibration-damping manner, comprising:

an inner sleeve to be fixed to one of said first and second members, said inner sleeve having an annular wing portion radially outwardly extending from an axially intermediate portion thereof;

a pair of intermediate support members opposed to each other in an axial direction thereof with a predetermined axial spacing therebetween,, each one of said support members having an annular bearing portion which faces the annular wing portion of the inner sleeve in the axial direction with a predetermined axial spacing therebetween, and a cylindrical portion which extends from an outer periphery of the annular bearing portion in the axial direction toward the other of the support members;

spacing means interposed between the cylindrical portions of said pair of intermediate support members, for preventing a relative axial movement of said support members and thereby maintaining said predetermined axial spacing between said support members;

an elastic body interposed between and elastically connecting said inner sleeve and said pair of intermediate support members, said elastic body cooperating with said inner sleeve to define an annular recess which is open radially outwardly through an axial spacing between said cylindrical portions of said support members, said annular recess having a bottom partially raised in a radially outward direction by said annular wing portion; and an outer sleeve to be fixed to the other of said first and second members, said outer sleeve being fitted on outer circumferential surfaces of said cylindrical portions of said support members, and closing an opening of said annular recess to thereby form an annular fluid chamber which is filled with a non-compressible fluid and which has an axially middle restricted portion whose radial dimension is reduced by said annular wing member.

2. A fluid-filled cylindrical elastic mount according to claim 1, wherein said spacing means comprises a plurality of legs which are integral parts of at least one of the cylindrical portions of said pair of intermediate support members.

3. A fluid-filled cylindrical elastic mount according to claim 2, wherein said plurality of legs include a plurality of first legs which extend from one of said cylindrical portions in the axial direction toward the other cylindrical portion and which are spaced from each other in a circumferential direction of the cylindrical portions.

4. A fluid-filled cylindrical elastic mount according to claim 3, wherein said first legs consist of two first legs which are opposed to each other in a diametric direction of said one cylindrical portion.

5. A fluid-filled cylindrical elastic mount according to claim 3, wherein said plurality of legs further include a plurality of second legs which extend from said other cylindrical portion in the axial direction toward said one cylindrical portion and which are held in abutting contact with said plurality of first legs, respectively.

6. A fluid-filled cylindrical elastic mount according to claim 5, wherein said second legs consist of two second legs which are opposed to each other in a diametric direction of said other cylindrical portion.

7. A fluid-filled cylindrical elastic mount according to claim 1, further comprising a cylindrical mounting bracket having a cylindrical portion fitted on an outer circumferential surface of said outer sleeve, said mounting bracket further having a pair of inward flanges which extend radially inwardly from opposite axial ends of said cylindrical portion and which are held in abutting contact with said annular bearing portions of said pair of intermediate support members, respectively, to thereby prevent a relative axial movement of said support members away from each other.

8. A fluid-filled cylindrical elastic mount according to claim 7, wherein said cylindrical mounting bracket consists of an upper and a lower members which have said pair of inward flanges, respectively, said upper and lower members being fixed to each other such that said pair of intermediate support members are axially pressed toward each other by said inward flanges.

9. A fluid-filled cylindrical elastic mount according to claim 1, further comprising an annular sealing rubber layer interposed between said outer sleeve and said cylindrical portions of said pair of intermediate support members.

10. A fluid-filled cylindrical elastic mount according to claim 1, wherein said inner sleeve has a pair of tapered outer circumferential surfaces on axially opposite sides of said annular wing portion, each of said tapered outer circumferential surfaces having a diameter which increases in the axial direction from the corresponding axial end of said inner sleeve toward said axially intermediate portion of the inner sleeve.

* * * * *